Jan. 4, 1938.   F. F. FRICK ET AL   2,104,076
LEAD RECOVERY
Filed Nov. 5, 1934
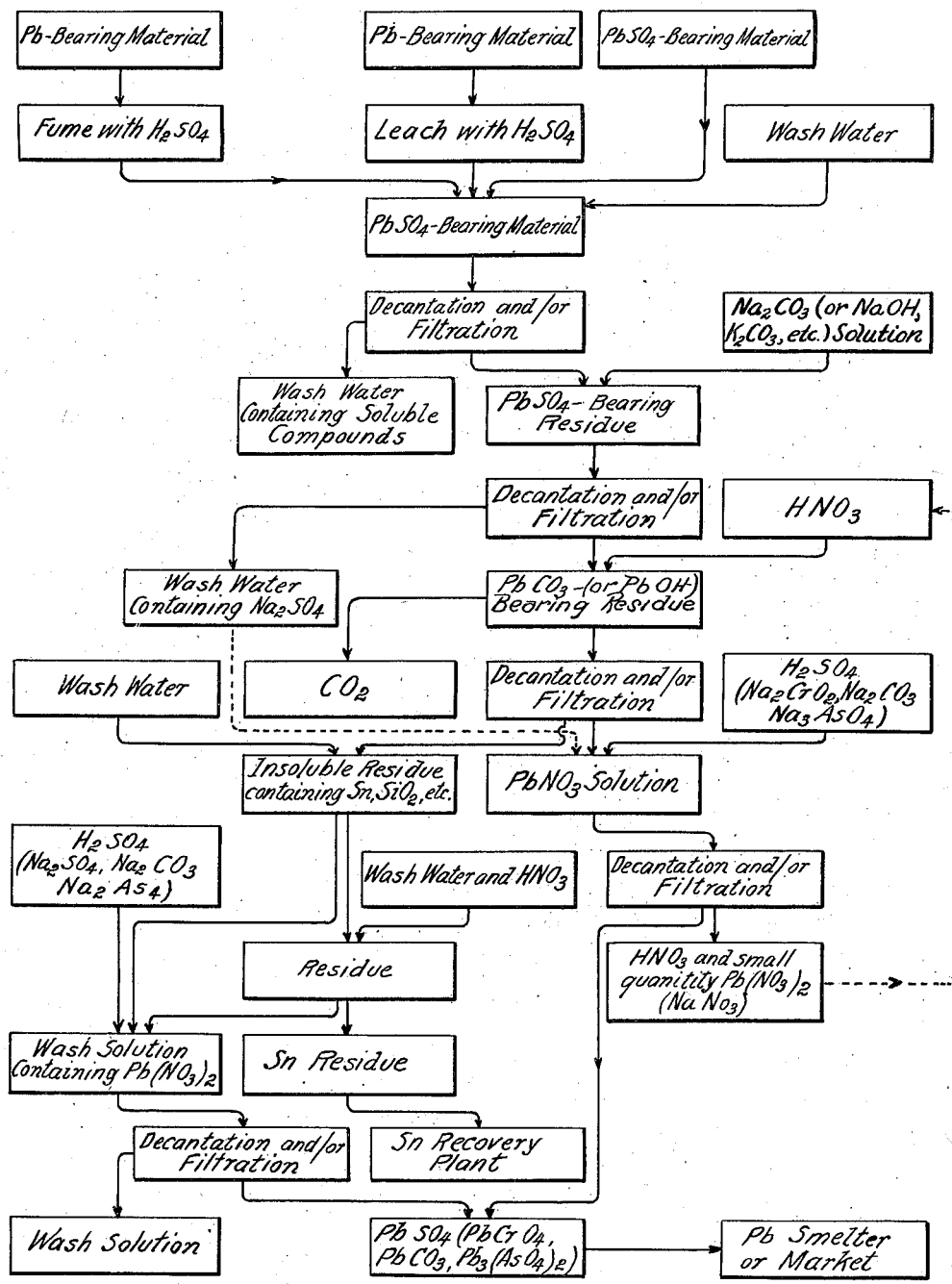
INVENTORS
FREDERICK F. FRICK
JEHU. P. COOPER
BY
Pennie, Davis, Marvin & Edmonds
ATTORNEYS Patented Jan. 4, 1938

2,104,076

UNITED STATES PATENT OFFICE 2,104,076

LEAD RECOVERY

Frederick F. Frick and Jehu P. Cooper, Anaconda, Mont., assignors to Anaconda Copper Mining Company, New York, N. Y., a corporation of Montana Application November 5, 1934, Serial No. 751,448

10 Claims. (Cl. 75—99)

This invention relates to the metallurgy of lead and has for an object the provision of an improved method for recovering lead from lead-bearing materials in forms suitable for the production of elemental lead or compounds of lead.

The invention contemplates the treatment of all lead-bearing materials which can be treated according to the method of the invention to produce a desirable product, but the method of the invention is particularly valuable for the treatment of electrolytic slimes and residues containing lead in intimate association with other substances. Therefore, for purposes of illustration, the invention will be described with particular reference to its application to the treatment of slimes or residues obtained in electrolytic processes.

In the recovery of metal values from scrap or secondary metals, such, for examples, as alloys containing copper, lead and tin, electrolytic methods are frequently employed for the recovery of the copper. Such methods result in the production of an electrolytic cell slime or residue containing lead in association with other substances, such as tin, antimony, and the like. It has been proposed heretofore to treat lead-bearing materials of this nature by the so-called brine leaching process. According to this process, the material is leached with a nearly saturated solution of sodium chloride to produce a brine solution of lead chloride and a solid residue. The solid residue is separated from the lead chloride solution, and the lead is subsequently recovered by electrolysis, precipitation, or other suitable means.

The brine leaching process involves many disadvantages. For example, at ordinary temperatures lead is soluble in brine only to the extent of about 10 to 15 grams per liter, so that relatively large volumes of solution must be employed. Since the solution is nearly saturated with sodium chloride, separation of the solid residue is very difficult. The residues must be washed with brine solution to remove all of the soluble lead, and it is then usually necessary to wash the residues thoroughly with water in order to remove the brine, as chlorides are often objectionable in their subsequent treatment. When lead is precipitated from the brine solution, basic chloride salts are carried down by the precipitate, from which it is impossible to remove them by water washing. If the lead in the lead-bearing material is in the form of lead sulphate, as it usually is in the case of electrolytic slimes or residues, sodium sulphate builds up in the brine, reducing its effectiveness as a solvent and, eventually, necessitating discarding or purification.

The process of the present invention possesses the advantages of the brine leaching process, and avoids its disadvantages. It is particularly well adapted to the treatment of lead sulphate-bearing materials, but may readily be applied to the treatment of other lead-bearing substances.

According to the method of the invention, the lead-bearing residue is treated to form a lead product which is substantially insoluble in water but which is readily soluble in an acid. Lead carbonate and lead hydrate possess these qualifications, and conversion of the lead to one or both of these products is particularly advantageous in the practice of the invention. The lead product is separated from water-soluble substances in the material by washing with water, and the washed product is treated with an acid to dissolve the lead and to leave an insoluble residue. Lead is recovered from the resulting solution and the insoluble residue may be treated to recover valuable components therefrom.

Consideration of the following description in conjunction with the accompanying flow sheet will afford a better understanding of the invention. It will be understood, however, that modifications may be made in the process outlined below and illustrated in the flow sheet without departing from the spirit of the invention.

As indicated above, the process is of particular value in the treatment of materials containing lead in the form of lead sulphate. If the lead is present in another form, it may generally be converted to the sulphate by leaching or fuming the material with sulphuric acid, or by any other method of sulphation. Although the invention contemplates direct treatment of materials containing lead in other forms than the sulphate, sulphation of the material is preferred for a number of reasons. For example, if the material is sulphated, other substances than lead, such as copper and zinc, are also converted to the sulphate, and may be leached from the substantially insoluble lead-sulphate bearing residue with water. Moreover, lead sulphate is particularly amenable to conversion to the form of lead carbonate and/or lead hydrate.

The lead-bearing material, preferably with the lead in the form of sulphate, is treated to form a water-insoluble, acid-soluble lead product, such as lead carbonate and/or lead hydrate. This may be accomplished by subjecting the material, either hot or cold, to what may be termed a carbonation operation. During this operation, the lead-bearing material is treated with a solution containing the carbonate or hydroxide of sodium, potassium, or ammonium. One or more of these substances may be employed in the solution. For example, very satisfactory results may be obtained by employing a solution containing both sodium carbonate and sodium hydroxide. The reactions proceed easily and substantially to completion in accordance with the following typical equations:

$$PbSO_4+Na_2CO_3 \rightarrow PbCO_3+Na_2SO_4$$
$$PbSO_4+2NaOH \rightarrow Pb(OH)_2+Na_2SO_4$$

We have found that carbonation proceeds more satisfactorily when more than the theoretical amount of sodium carbonate necessary to convert the lead sulphate to lead carbonate is employed. The reason for this is not apparent, unless it be owing to the reversible nature of the carbonation reactions. Whatever the reason, better results are obtained if an excess of sodium carbonate is employed.

The insoluble lead-bearing residue is separated from the solution by filtration or decantation, or both. Because it is simpler and requires less expensive apparatus, decantation is preferred. It is advantageous to decant and wash the precipitate several times in order to insure more perfect separation of the soluble and insoluble matter, and thus to obtain a purer product. Whether or not the washings from successive decantations and/or filtrations are united will depend upon the further use that is made of them. Substantially this same procedure may be followed at other stages of the process where it is desired to separate liquids and solids.

It is possible to wash soluble sulphates from the lead-bearing material after sulphation (if the material has been sulphated) and prior to carbonation, but higher lead-recovery will generally be obtained if this washing is postponed until the carbonation treatment has been completed, for both lead carbonate and lead hydrate are more insoluble than lead sulphate, although the tendency of the lead sulphate to dissolve may be reduced by adding a small quantity of sulphuric acid to the wash water. To be offset against this, however, are the advantages that may be obtained by washing out zinc and copper, and other soluble sulphates without obtaining in the solution the sodium sulphate that is produced if a sodium salt is employed during the carbonation. Moreover, by washing prior to carbonation, any acid in the lead-bearing material will be extracted, and consequently less sodium carbonate and/or hydroxide will be needed to form the lead carbonate and/or hydrate, since none of the reagent will be wasted in neutralizing the acid.

The washed insoluble residue is treated with an acid, either organic or inorganic but preferably in aqueous solution, to dissolve the lead carbonate and form a water-soluble lead salt. Nitric or acetic acid may be employed for this purpose, in which case lead acetate or lead nitrate is formed:

$$PbCO_3+2HNO_3 \rightarrow Pb(NO_3)_2+CO_2+H_2O$$
$$Pb(OH)_2+2HNO_3 \rightarrow Pb(NO_3)_2+2H_2O$$
$$PbCO_3+2CH_3COOH \rightarrow (CH_3COO)_2Pb+H_2O+CO_2$$
$$Pb(OH)_2+2CH_3COOH \rightarrow (CH_3COO)_2Pb+2H_2O$$

The lead, now in solution, is separated by decantation and/or filtration from the insoluble residue, which may contain tin, silica, and other constituents. The solution may be treated in any suitable manner for the recovery of lead, but it is preferred to precipitate it in a substantially insoluble form, preferably with a reagent capable of regenerating the acid employed to dissolve the lead carbonate and/or lead hydrate. Sulphuric acid is such a reagent, and for many purposes its use is preferred. However, if it is desired to recover the lead as a compound the acid of which is not readily or cheaply obtainable, the lead may be precipitated by the sodium salt or its equivalent of the acid. Sodium chromate, sodium arsenate, and sodium carbonate are examples of such precipitants. The following reactions are typical of the precipitation of substantially insoluble lead compounds:

$$Pb(NO_3)_2+H_2SO_4 \rightarrow PbSO_4+2HNO_3$$
$$3(CH_3COO)_2Pb+2Na_3AsO_4 \rightarrow Pb_3(AsO_4)_2+6CH_3COONa$$
$$PbNO_3+Na_2CrO_4 \rightarrow PbCrO_4+2NaNO_3$$
$$3Pb(NO_3)_2+2Na_2CO_3+2H_2O \rightarrow Pb_3(OH)_2(CO_3)_2+4NaNO_3+2HNO_3$$

If sulphuric acid or its equivalent is employed to precipitate the lead, the regenerated nitric acid is returned to the process to dissolve a further quantity of lead carbonate. In this case it is important that less sulphuric acid than the quantity theoretically necessary to precipitate the lead in solution be employed. Otherwise, the regenerated nitric acid will contain sulphuric acid, and upon treating lead carbonate with it, a quantity of lead sulphate corresponding to the quantity of sulphuric acid present will be precipitated and separated with the insoluble residue. A preferred practice contemplates the use of about 90 to 95% of the theoretical quantity of sulphuric acid in the precipitation of lead sulphate, allowing a small quantity of lead nitrate to recirculate with the regenerated nitric acid.

Instead of sulphuric acid, the sodium sulphate formed during the carbonation step and recovered in solution in the water used for washing the lead carbonate may be used as a precipitant. If this or any other sodium salt or its equivalent is employed in this capacity, it is obvious that the acid will not be regenerated; instead sodium nitrate or its equivalent will be formed in the solution, and may be recovered therefrom by evaporation or in any other suitable manner if conditions warrant the additional expense involved.

The choice of precipitant will depend upon the purpose for which the lead is to be employed. At present, we prefer to precipitate lead sulphate and smelt the precipitate for the recovery of metallic lead. From the foregoing, however, it is readily apparent that pigments such as lead chromate or white lead, insecticides such as lead arsenate, and the like may be precipitated and employed as such.

It is possible to economize on reagents and to avoid the accumulation of large volumes of solution in the system, particularly if nitric acid is regenerated and recirculated, if the insoluble residue remaining after separation of the lead nitrate solution is washed and the washings are collected and treated separately from the solution first separated. In a preferred process, the separated residue is washed once with water and then once with very dilute nitric acid. It has been found that if water is used for both washings, a basic lead nitrate is formed and precipitated, resulting in a loss of lead. The addition of a small quantity of acid to the water employed in the second washing of the residue overcomes this tendency and holds the lead in solution as lead nitrate.

The wash solutions from the washings of the residue are united and are treated for the recovery of the lead, preferably by precipitation with a suitable precipitant, such as sulphuric acid. The precipitate is separated from the solution by decantation and/or filtration, and may be treated for the recovery of metallic lead or be otherwise disposed of. The final solution, containing a small quantity of nitric acid and/or sodium nitrate, may be discarded, as recovery of the acid or salt dissolved therein would generally entail undue expense.

Various modifications in the operating details of the process as outlined above may be made, but will generally depend upon prevailing conditions and the ends desired. In some cases, it is possible to obtain a higher carbonation efficiency by carrying out the carbonation operation in two or more stages. Thus, the lead-bearing material may be treated first with a relatively dilute solution of sodium carbonate until the sodium carbonate is exhausted. The residual solution may then be separated and discarded, unless it is desired to recover dissolved salts, and the carbonation of the insoluble residue may be completed by treatment with a relatively concentrated solution of sodium carbonate. After separation of the lead carbonate at the completion of the second carbonation, the solution remaining may be employed in the first carbonation stage of a fresh portion of lead-bearing material.

Similarly, it is possible to effect the dissolution of the lead carbonate in two or more stages, by employing only enough acid to produce a substantially neutral solution of lead nitrate in the first stage and employing enough acid in the second stage to produce an acid solution of lead nitrate. If the process is carried out in this manner, care should be taken to avoid the precipitation of basic lead nitrate during the first stage.

The process of the invention presents marked advantages over processes heretofore proposed or employed for the treatment of lead-bearing materials. Decantation and filtration are more easily accomplished than in the brine leaching process mentioned above. No chlorides, sulphates, or other soluble compounds are present in the final solutions to contaminate the product. Plain water is employed in most stages of the process for washing purposes, and, as compared with the brine leaching process, relatively concentrated solutions, not approaching saturation, of 60 grams or more of lead per liter may be used. Moreover, solution of the lead does not depend upon the solvent action of another salt in solution.

By way of example, the following typical applications of the process of the invention to the treatment of lead-bearing materials are presented. They are intended as illustrative only, and it is to be understood that they are not to be construed as limiting the scope of the appended claims.

*Example 1*

Lead-bearing material: Slime resulting from the electrolytic treatment of secondary metal and containing about 21% Sn in the form of oxide and 37% Pb in the form of sulphate.

One ton of the slime is treated with about five tons of a solution containing 500 to 600 lbs. of $Na_2CO_3$ per ton of solution. The mixture is agitated, either hot or cold, for about an hour, during which period the lead sulphate is converted to lead carbonate, the tin oxides remaining substantially unaffected.

At the end of the period, the solids are separated and washed with water until the washings are substantially free of sulphates. The washed residue is treated with about 800 lbs. $HNO_3$ and about five tons of water to dissolve the lead carbonate, and the remaining insoluble residue, which contains the bulk of the tin, is separated from the resulting solution of lead nitrate. The lead nitrate solution is then treated with about 350 lbs. sulphuric acid, which is the amount required to precipitate 90 to 95% of the lead as lead sulphate. (If a substantially greater quantity of sulphuric acid were employed, the regenerated nitric acid would contain some sulphuric acid, and its use in the dissolution of a further quantity of lead carbonate would result in the precipitation of lead sulphate and the loss thereof in the separated tin oxide residue.) Lead sulphate is separated from the solution and may be sent to a lead smelter. The solution, containing regenerated nitric acid and some lead nitrate, is re-employed in the treatment of a further quantity of lead carbonate, so that the process is cyclic so far as the nitric acid is concerned.

The tin present in the original slime is substantially unaffected by the treatment. The products include a tin residue containing about 50% Sn and a small amount of lead, and a lead product containing about 67% Pb and a few hundredths of a percent Sn.

*Example 2*

Lead-bearing material: A metallurgical plant flue dust containing about 20% Pb together with some Cu, Zn, $SiO_2$ and other substances.

A quantity of the flue dust is mixed with an excess of 60° Bé. sulphuric acid, and the mixture is treated in a furnace at about 1000–1200° F. until suitably sulphated. Upon completion of the sulphation reaction, the material is removed from the furnace, cooled, and leached with water containing a small quantity of $H_2SO_4$ to extract soluble sulphates, leaving a residue containing lead sulphate and various inert materials.

The lead-sulphate-bearing residue is treated with sodium carbonate to form lead carbonate, and at the conclusion of this operation, the solids are separated and washed. The lead carbonate is subjected to a two-stage treatment with nitric acid to obtain a substantially neutral solution of lead nitrate, from which the lead is precipitated as lead arsenate by the addition of sodium arsenate. The lead arsenate is separated from the liquor by filtration and is dried to obtain a marketable product. Sodium nitrate may be recovered from the filtrate if desired.

We claim:

1. The method of recovering lead from slime produced in an electrolytic operation and containing tin in the oxide form and lead in the sulphate form, which comprises subjecting the slime to the action of an aqueous solution of sodium carbonate to convert the lead sulphate contained therein to lead carbonate, treating the resulting product to separate the lead carbonate from water soluble substances associated therewith, subjecting the lead carbonate to the action of nitric acid to form a solution of lead nitrate, subjecting the lead nitrate solution to the action of sulphuric acid in an amount less than that required to precipitate all of the lead contained therein as lead sulphate, thereby to form a precipitate of lead sulphate and a solution containing nitric acid and lead nitrate, and utilizing the solution containing nitric acid and lead nitrate for the treatment of additional lead carbonate-bearing material.

2. The method of recovering lead from lead-bearing material which comprises subjecting the material to the action of an agent capable of converting the lead contained therein to an acid-soluble lead compound of the group consisting of lead carbonate and lead hydrate, subjecting the lead compound thereby obtained to the action of an acid capable of serving as a solvent for the lead compound to obtain a lead-bearing solution, treating the resulting solution with sulphuric acid in an amount less than that required to precipitate all of the lead contained therein as lead sulphate, thereby forming a precipitate of lead sulphate and a substantially sulphuric-acid-free, acidic solution, separating the lead sulphate from the solution, and utilizing the solution in the treatment of additional acid-soluble lead compound.

3. The method of recovering lead from lead-bearing material which comprises subjecting the material to the action of sodium carbonate to convert the lead contained therein to lead carbonate, subsequently subjecting the lead carbonate to the action of an acid capable of serving as a solvent therefor to obtain a lead-bearing solution, treating the resulting solution with sulphuric acid in an amount equal to about 90 to 95% of the amount theoretically necessary to precipitate all of the lead contained therein as lead sulphate, thereby forming a precipitate of lead sulphate and a substantially sulphuric-acid-free acidic solution, separating the lead sulphate precipitate from the solution, and utilizing the solution in the treatment of additional lead carbonate.

4. The method of recovering lead from lead-bearing material which comprises subjecting the material to the action of sodium hydroxide to convert the lead contained therein to lead hydrate, subsequently subjecting the lead hydrate to the action of an acid capable of serving as a solvent therefor to obtain a lead-bearing solution, treating the resulting solution with sulphuric acid in an amount equal to about 90 to 95% of the amount theoretically necessary to precipitate all of the lead contained therein as lead sulphate, thereby forming a precipitate of lead sulphate and a substantially sulphuric-acid-free acidic solution, separating the lead sulphate precipitate from the solution, and utilizing the solution in the treatment of additional lead hydrate.

5. The method of recovering lead from an alloy containing copper, lead and tin which comprises subjecting the alloy to an electrolytic operation during the course of which copper is electrolytically deposited and a water-insoluble slime containing lead and tin is produced, treating the slime with at least one of the reagents of the group consisting of sodium carbonate, potassium carbonate, ammonium carbonate, sodium hydroxide, potassium hydroxide and ammonium hydroxide to convert the lead contained therein to a water-insoluble, acid-soluble lead product, subjecting the lead product thus obtained to the action of an acid capable of dissolving it to form a solution containing dissolved lead, and treating the resulting solution to recover its lead content.

6. The method of recovering lead from an alloy containing copper, lead and tin which comprises subjecting the alloy to an electrolytic operation during the course of which copper is electrolytically deposited and a water-insoluble slime containing lead and tin is produced, treating the slime with sodium carbonate to convert the lead contained therein to lead carbonate, washing the lead carbonate to remove water-soluble substances, subjecting the washed lead carbonate to the action of an acid capable of serving as a solvent therefor to obtain a lead-bearing solution, and treating said solution to recover its lead content.

7. The method of recovering lead from an alloy containing copper, lead and tin which comprises subjecting the alloy to an electrolytic operation during the course of which copper is electrolytically deposited and a water-insoluble slime containing lead and tin is produced, treating the slime with sodium hydroxide to convert the lead contained therein to lead hydrate, washing the lead hydrate to remove water-soluble substances, subjecting the washed lead hydrate to the action of an acid capable of serving as a solvent therefor to obtain a lead-bearing solution, and treating said solution to recover its lead content.

8. The method of treating lead-bearing material containing tin which comprises subjecting the material to the action of at least one of the reagents of the group consisting of sodium carbonate, potassium carbonate, ammonium carbonate, sodium hydroxide, potassium hydroxide and ammonium hydroxide to obtain a product containing lead in an acid-soluble form and tin in an acid-insoluble form, subjecting said product to the action of an acid capable of dissolving the acid-soluble lead but incapable of dissolving the acid-insoluble tin to form a solution containing lead and a residue containing tin, treating the solution to recover its lead content, and treating the residue to recover its tin content.

9. The method of treating lead-bearing material containing tin which comprises subjecting the material to the action of sodium carbonate to obtain a product containing lead in the form of lead carbonate and tin in an acid-insoluble form, washing the product thus obtained with water to separate water-soluble substances therefrom, subjecting the washed product to the action of an acid capable of dissolving the acid-soluble lead but incapable of dissolving acid-insoluble tin to form a solution containing lead and a residue containing tin, treating the solution to recover its lead content, and treating the residue to recover its tin content.

10. The method of treating lead-bearing material containing tin which comprises subjecting the material to the action of sodium hydroxide to obtain a product containing lead in the form of lead hydrate and tin in an acid-insoluble form, washing the product thus obtained with water to separate water-soluble substances therefrom, subjecting the washed product to the action of an acid capable of dissolving the acid-soluble lead but incapable of dissolving acid-insoluble tin to form a solution containing lead and a residue containing tin, treating the solution to recover its lead content, and treating the residue to recover its tin content.

FREDERICK F. FRICK.
JEHU P. COOPER.